United States Patent
Takeoka

(10) Patent No.: US 7,830,645 B2
(45) Date of Patent: Nov. 9, 2010

(54) DIELECTRIC CERAMICS AND MULTI-LAYER CERAMIC CAPACITOR USING SAME

(75) Inventor: Sinsuke Takeoka, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 319 days.

(21) Appl. No.: 12/163,913

(22) Filed: Jun. 27, 2008

(65) Prior Publication Data

US 2009/0046410 A1    Feb. 19, 2009

(30) Foreign Application Priority Data

Jun. 29, 2007   (JP)   ............................. 2007-171337

(51) Int. Cl.
*H01G 4/06* (2006.01)
*C04B 35/00* (2006.01)

(52) U.S. Cl. .................. 361/321.4; 361/321.5; 501/136

(58) Field of Classification Search ... 361/321.1–321.5, 361/311; 501/135–136
See application file for complete search history.

(56) References Cited

U.S. PATENT DOCUMENTS

| | | | |
|---|---|---|---|
| 6,233,134 B1 * | 5/2001 | Sakamoto et al. | 361/311 |
| 7,172,985 B2 * | 2/2007 | Pinceloup et al. | 501/135 |
| 2007/0009719 A1 * | 1/2007 | Naito et al. | 428/210 |

FOREIGN PATENT DOCUMENTS

| JP | H05-217426 A1 | 8/1993 |
|---|---|---|
| JP | H11-106259 A1 | 4/1999 |
| JP | 2000-053466 A | 2/2000 |
| JP | 2002-356371 A | 12/2002 |
| JP | 2004-107629 A | 7/2004 |

\* cited by examiner

*Primary Examiner*—Eric Thomas
(74) *Attorney, Agent, or Firm*—Law Office of Katsuhiro Arai

(57) ABSTRACT

Dielectric ceramics represented as: $Ca_xZrO_3+aMn+bLi+cB+dSi$ and comprising: based on 100 mol of $Ca_xZrO_3$ (where $1.00 \leq x \leq 1.10$), $0.5 \leq a \leq 4.0$ mol, and $6.0 \leq b+c+d \leq 15.0$ mol, in which $0.15 \leq b/(c+d) \leq 0.55$, and $0.20 \leq d/c \leq 3.30$ or multi-layer ceramic capacitor using the same.

8 Claims, No Drawings

DIELECTRIC CERAMICS AND MULTI-LAYER CERAMIC CAPACITOR USING SAME

BACKGROUND OF THE INVENTION

1. Field of the Invention

The present invention concerns dielectric ceramics comprising $CaZrO_3$ as a main ingredient and a multi-layer ceramic capacitor of excellent life characteristics using the same and, more in particular, it relates to dielectric ceramics used for a multi-layer ceramic capacitor including an internal electrode comprising Cu or Cu alloy and a multi-layer ceramic capacitor using the same.

2. Description of the Related Art

Heretofore, dielectric ceramics are used, for example, in dielectric resonators, filters, or multi-layer capacitors. For the dielectric ceramics used for the multi-layer capacitors, etc., it has been desired that the temperature coefficient of static capacitance (permittivity) is smaller along with increase in the working frequency of equipments in recent years (about 100 MHz to 2 GHz). Further, for the characteristics of the multi-layer capacitor used in high frequency circuits, it has been demanded that ESR (equivalent series resistance) is lower and the loss in the high frequency region is smaller (higher Q value). On the other hand, in view of reduction for the cost, it is necessary to select a base metal as an internal electrode of low specific resistivity. Accordingly, Cu is used instead of Ni and Pd. Further, for dielectrics, those having high Q value, small temperature coefficient of the permittivity and high reliability are demanded. Further, since Cu is used for the internal electrode, it has been demanded for the dielectrics that they can be fired at a relatively low temperature of 1080° C. or lower and they are non-reducing materials in order to prevent oxidation of Cu. Further, with an environmental view point, dielectrics not containing Pb or Bi are desired. Patent documents 1 and 2 disclose inventions concerning dielectric ceramic compositions satisfying such demands and further show the use of such dielectric ceramic compositions to multi-layer ceramic capacitors.

[Patent document 1] JP-A-5-217426

[Patent document 2] JP-A-11-106259

The patent document 1 shows a non-reducing dielectric ceramic composition containing $(Ca_{1-x}Sr_x)_m(Zr_{1-y}Ti_y)O_3$-$zMnO_2$-$wSiO_2$ as a main ingredient, and $a(LiO_{1/2})$—RO)-$(1-a)(BO_{3/2}$—$SiO_2)$ (in which RO is at least one member of SrO, BaO and CaO) as an additive. The non-reducing dielectric ceramic composition "enables to obtain dielectric ceramics that can be fired at a low temperature of about 1000° C. or lower, can use copper as an electrode material, in addition, has a high Q value and permittivity, and is also stable for the temperature characteristic of the permittivity" (column [0005]). However, no sufficient study has been made on the improvement of the life characteristic of the multi-layer ceramic capacitor using Cu as the internal electrode.

The patent document 2 shows a dielectric ceramic composition containing a composite oxide represented by $(CaO)_x(Zr_{1-y}\cdot Ti_y)O_2$, an Mn compound, and a glass ingredient represented by $(aLi_2O$-$bB_2O_3$-$cCaO)$. The dielectric ceramic composition "can be fired even in a reducing atmosphere at 1000° C. or lower, has high permittivity, in addition, is stable for the temperature characteristic of permittivity, has a Q value as Qf in a high frequency region (GHz band) of 10000 or more, with the Q value being remarkably improved particularly in the high frequency region" (column 0015). However, no sufficient study has been made on the improvement of the life characteristic of the multi-layer ceramic capacitor using Cu as the internal electrode.

SUMMARY OF THE INVENTION

In a certain aspect of the invention, it is intended to solve at least one of subjects not studied sufficiently in the techniques described above and intended to improve the life characteristic of a multi-layer ceramic capacitor using dielectric ceramics comprising $CaZrO_3$ as a main ingredient and using Cu as an internal electrode.

In another aspect of the invention, at least one of the following means is adopted for solving one or more of the subjects described above.

(1) Dielectric ceramics represented as:
$Ca_xZrO_3+aMn+bLi+cB+dSi$, comprising:
based on 100 mol of $Ca_xZrO_3$ (where Ca includes a partial substitute by Sr, etc., Zr includes a partial substitute by Ti, etc., and $1.00 \leq x \leq 1.10$),
$0.5 \leq a \leq 4.0$ mol, and
$6.0 \leq b+c+d \leq 15.0$ mol, in which
$0.15 \leq b/(c+d) \leq 0.55$, and
$0.20 \leq d/c \leq 3.30$.

(2) Dielectric ceramics according to (1) above, wherein a portion of Ca in the $Ca_xZrO_3$ is substituted by Sr.

(3) Dielectric ceramics according to (1) or (2) above, wherein a portion of Zr in the $Ca_xZrO_3$ is substituted by Ti.

The dielectric ceramics (2) or (3) above can be represented, for example, as $(Ca_ySr_{1-y})_x(Zr_zTi_{1-z})O_3$ (where $1.00 \leq x \leq 1.10$, $0 < y \leq 1$, $0 < z \leq 1$).

(4) Dielectric ceramics according to any one of (1) to (3) above, wherein Mg and/or Al is further contained.

(5) A multi-layer ceramic capacitor including a plurality of dielectric ceramic layers, an internal electrode comprising Cu or a Cu alloy formed between the dielectric ceramic layers, and an external electrode connected electrically with the internal electrode, wherein the dielectric ceramic layer comprises dielectric ceramics according to any one of (1) to (4) described above.

Use of the dielectric ceramics based on the aspects disclosed here in which the composition comprising $CaZrO_3$ as the main ingredient is specified provides an effect of improving the life characteristic of a multi-layer ceramic capacitor using Cu as the internal electrode.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

DETAILED DESCRIPTION OF THE PREFERRED EMBODIMENT

The present inventors have made a study on the improvement of the life characteristic of multi-layer ceramic capacitor using Cu as an internal electrode and have found that the Ca/Zr ratio and the content of Mn, Li, B, and Si of CaZrO$_3$ type dielectric ceramics are determinative factors for the life to accomplish the invention. Further, conditions for the Ca/Zr ratio and the Li—B—Si compositional ratio that the CaZrO$_3$ type dielectric ceramics are densified at 1000° C. or lower even in a state of suppressing the content of Li and B in order not to lower the life in view of the use of the Cu internal electrode have been found.

When the Ca/Zr ratio in the Ca$_x$ZrO$_3$ type dielectric ceramics is defined as in a range of: $1.00 \leq x \leq 1.10$, the life characteristics can be improved. The range described above is preferred since the life characteristic is deteriorated when the value for x is less than 1.00 or more than 1.10.

For the Mn content, that is, the value for a, the life characteristic is improved by defining the range as: $0.5 \leq a \leq 4.0$ mol based on 100 mol of Ca$_x$ZrO$_3$. The range described above is preferred since the life characteristic is deteriorated when the value for a is less than 0.5 mol or more than 4.0.

When the total content b+c+d for Li+B+Si is defined as within a range of: $6.0 \leq b+c+d \leq 15.0$ mol based on 100 mol of Ca$_x$ZrO$_3$, sintering (densification) is possible at 1000° C. or lower, and the life characteristic is improved. The range described above is preferred since sintering cannot be conducted at 1000° C. or lower when b+c+d is less than 6.0 and the life characteristic is deteriorated when it is more than 15.0 mol.

When the Li/(B+Si) ratio, b/(c+d) is defined as within a range of $0.15 \leq b/(c+d) \leq 0.55$, sintering (densification) is possible at 1000° C. or lower. The range described above is preferred since sintering (densification) is not possible when b/(c+d) is less than 0.15 or more than 0.55.

When the Si/B ratio, that is, d/c is defined as: $0.20 \leq d/c \leq 3.30$, sintering (densification) at 1000° C. or lower is possible and the life characteristic is improved. The range described above is preferred since the life characteristic is deteriorated when d/c is less than 0.20 and sintering at 1000° C. or lower is not possible when it is more than 3.30.

For optionally designing dielectric characteristics, etc. it is also possible to substitute a portion of Ca$_x$ZrO$_3$ as the main ingredient of the dielectrics by Sr, Ti or the like into (Ca$_y$Sr$_{1-y}$)$_x$(Zr$_z$Ti$_{1-z}$)O$_3$ (where $1.00 \leq x \leq 1.10$, $0 < y \leq 1$, $0 < z \leq 1$). That is, (Ca$_{0.9}$Sr$_{0.1}$)$_x$ZrO$_3$, Ca(Zr$_{0.9}$Ti$_{0.1}$)$_x$O$_3$, etc. can be used as the main ingredient. Further, for optionally designing the dielectric characteristic or the like, other elements such as Mg and Al can also be added together with Mn, Li, B and Si.

The method of manufacturing the multi-layer ceramic capacitor is not particularly restricted and the following methods can be adopted. As the starting material, CaCO$_3$, ZrO$_2$ and, further, optionally, SrCO$_3$, TiO$_2$, etc. are provided, and the starting materials are weighed so as to obtain a predetermined composition. Then, after wet mixing the starting materials and drying them, they were calcined at 800 to 1200° C. to obtain Ca$_x$ZrO$_3$. For Ca$_x$ZrO$_3$ synthesized as described above, starting Mn material (oxide, carbonate, etc.), starting Li material (Li$_2$CO$_3$, etc.), starting B material (B$_2$O$_3$, etc.) and starting Si material (SiO$_2$, etc.) and, further optionally, starting Mg material (MgO), starting Al material (Al$_2$O$_3$), etc. are weighed so as to obtain a predetermined composition. Then, the starting materials are wet-mixed and dried to obtain a dielectric powder. A PVB binder (or acryl binder), a plasticizer, and an organic solvent as a solvent are added properly to the dielectric powder obtained as described above to prepare a slurry and a green sheet of a predetermined thickness (5 to 50 μm) is prepared. A Cu paste for internal electrode was printed, laminated, and press bonded to the green sheet, and is then cut out into predetermined shape. Then, a debinding treatment is applied under an inert atmosphere at 300 to 600° C. such that Cu is not oxidized and firing is conducted in a reducing atmosphere at 900 to 1050° C. for 1 to 5 hours. After coating a Cu external electrode paste as a terminal electrode to the obtained sintered body, it is baked in an N$_2$ atmosphere.

In the present disclosure where conditions and/or structures are not specified, the skilled artisan in the art can readily provide such conditions and/or structures in view of the present disclosure, as a matter of routine experimentation. Further, testing and/or measuring methods which are not specified in the present disclosure can be any suitable and/or conventional methods the skilled artisan in the art would employ.

EXAMPLES

Example 1

CaCO$_3$ and ZrO$_2$ were provided as starting materials. The starting materials were weighed and the Ca/Zr ratio, that is, the value for x was changed in a range from 0.98 to 1.12 as shown in Table 1. Then, after wet-mixing the starting materials in a ball mill and drying them, they were calcined at 1000° C. to obtain Ca$_x$ZrO$_3$ ($0.98 \leq x \leq 1.12$). MnCO$_3$, Li$_2$CO$_3$, B$_2$O$_3$, and SiO$_2$ were weighed based on the Ca$_x$ZrO$_3$ (hereinafter simply referred to as CaZrO$_3$), such that the Mn content, that is, the value a was changed in a range from 0 to 5.0 mol, the Li/(B+Si) ratio, that is, the value b/(c+d) was changed within a range from 0.21 to 0.50, the Si/B ratio, that is, the value d/c was changed in a range from 0.24 to 2.35, and the content b+c+d for the total of Li+B+Si was changed in a range from 3.0 to 18.0 mol based on 100 mol of CaZrO$_3$ as shown in Table 1. Then, by wet-mixing the starting materials in a ball mill and drying them, a dielectric powder was obtained. A PVB binder, a plasticizer, and an organic solvent as a solvent were added properly to the dielectric powder to prepare a slurry, and a green sheet of 12 μm thickness was prepared by a die coater. After printing a Cu paste for internal electrode by a screen printing method to the green sheet, and laminating and press-bonding the same by the number of electrodes of 11 layers (10 inter-layers), they were cut into 4.0 mm×2.0 mm. Then, a debinding treatment was conducted in an inert atmosphere at 300 to 600° C. and firing was conducted in a reducing atmosphere (nitrogen-hydrogen gas mixture: hydrogen ratio 1 to 3%) at 980° C. for 2 hr. Then, a Cu paste was coated as a terminal electrode and baked in an N$_2$ atmosphere. With the steps as described above, ten layer multi-layer ceramic capacitors (sample Nos. 101 to 121) each of 3.2 mm×1.6 mm size were manufactured.

By using the multi-layer ceramic capacitors described above, evaluation was conducted on the following characteristics.

(1) For sinterability (densification), samples (10×10×15 mm) were prepared each by the number of 5 according to the measuring method of JIS C 2141 separately from the example described above and measured. Those showing the water absorption of 0.1% or less when fired at 980° C. were evaluated as "⊚", and others were evaluated as "x".

(2) For the permittivity, each of the samples was prepared by the number of 20, the static capacitance at 1V-1 MHz was measured in a circumstance at 20° C. according to JIS C 5102 and it was determined based on the result of the measurement according to the following formula.

Permittivity=(capacitance×thickness of dielectric layer/(electrode crossing area×number of lamination))/permittivity of vacuum. The thickness of the dielectrics and the electrode crossing area were measured by using SEM observation for sample pieces.

(3) TC (static capacitance temperature characteristic) was measured based on the standards of JIS C 5101-8 (IEC 60384-8). Those showing the change of coefficient of capacitance within 0±30 (ppm/° C.) in a temperature range of −55° C. to 125° C. were indicated as C0G assuming the capacitance at 20° C. as a reference.

(4) Reliability: in a high temperature accelerated load test HALT (Highly Accelerated Life Time) test (condition: 30V/µm, 150° C.), those showing MTTF of 100 hr or more were evaluated as "◎" and those showing less than 100 hr were evaluated as "x". For sample Nos. 101 to 114, the composition for dielectrics and evaluation results for the characteristic of the capacitors are shown in Table 1.

Since the electric characteristics have no so significant difference with those of dielectric ceramics in the patent documents described in the part of the background art, they were omitted and only the basic characteristic, i.e., temperature characteristic of the permittivity and the static capacitance were shown.

As shown in Table 1, the capacitors of the sample Nos. 104 to 107, and 109 as examples of the present invention having the Ca/Zr ratio, that is, the value x of from 1.00 to 1.10, the Mn content, that is, the value a of from 0.5 to 4.0 mol, and the total content b+c+d for Li+B+Si is from 6.0 to 15.0 mol based on 100 mol of $CaZrO_3$ could be sintered (densified) at 1000° C. or lower and improved for the life as 100 hr or longer. On the contrary, in the capacitors of sample No. 102 with the Ca/Zr ratio of less than 1.00, and the capacitors of sample Nos. 110, 111 with the Ca/Zr ratio of exceeding 1.10, the life was less than 100 hr. In the capacitor of sample No. 103 not containing Mn and the capacitor of sample No. 108 with the Mn content exceeding 4.0 mol, the life was less than 100 hr. Further, the capacitor of sample No. 101 with the total content b+c+d for Li+B+Si of less than 6.0 mol could not be sintered (densified) at 1000° C. or lower, and the capacitor with the total content b+c+d for Li+B+Si exceeding 15.0 mol showed a life of less than 100 hr.

Example 2

Dielectric powders were obtained in the same manner as in Example 1 except for mixing while setting the Mn content, that is, the value a to 0.5 or 4.0 mol, the total content b+c+d for Li+B+Si to 6.0 or 15.0 mol, and changing the Li/(B+Si) ratio, that is, b/(c+d), and the Si/B ratio, that is, d/c as shown in Table 2 based on 100 mol of $CaZrO_3$ with the Ca/Zr ratio, that is, the value x of 1.00. Then, sample Nos. 201 to 217 as 10 layer multi-layer ceramic capacitors were manufactured each at a size of 3.2 mm×1.6 mm in the same manner as in Example 1 and evaluation was conducted on the characteristics. Table shows the result of evaluation for the composition of the dielectrics and each of the characteristics of the capacitors for sample Nos. 201 to 217.

TABLE 1

| Main Phase $CaZrO_3$ | Composition (mol % to $CaZrO_3$) | | | | Converted Value | | | Evaluation Item | | | |
|---|---|---|---|---|---|---|---|---|---|---|---|
| Sample No. | Ca/Zr ratio | Mn | Li | B | Si | Li + B + Si | Li/(B + Si) | Si/B | Densification | Permittivity | TC | HALT |
| 101 | 1.00 | 0.5 | 0.81 | 1.36 | 0.83 | 3.00 | 0.37 | 0.61 | X | — | — | — |
| 102 | 0.98 | 0.5 | 1.62 | 2.73 | 1.65 | 6.00 | 0.37 | 0.61 | ◎ | 27 | C0G | X |
| 103 | 1.00 | 0 | 1.62 | 2.73 | 1.65 | 6.00 | 0.37 | 0.61 | ◎ | 26 | C0G | X |
| 104 | 1.00 | 0.5 | 1.62 | 2.73 | 1.65 | 6.00 | 0.37 | 0.61 | ◎ | 27 | C0G | ◎ |
| 105 | 1.05 | 2.0 | 3.24 | 5.45 | 3.31 | 12.00 | 0.37 | 0.61 | ◎ | 26 | C0G | ◎ |
| 106 | 1.08 | 3.5 | 4.05 | 6.82 | 4.13 | 15.00 | 0.37 | 0.61 | ◎ | 26 | C0G | ◎ |
| 107 | 1.08 | 4 | 4.05 | 6.82 | 4.13 | 15.00 | 0.37 | 0.61 | ◎ | 26 | C0G | ◎ |
| 108 | 1.08 | 5 | 4.05 | 6.82 | 4.13 | 15.00 | 0.37 | 0.61 | ◎ | 27 | C0G | X |
| 109 | 1.10 | 3.5 | 4.05 | 6.82 | 4.13 | 15.00 | 0.37 | 0.61 | ◎ | 25 | C0G | ◎ |
| 110 | 1.12 | 3.5 | 4.05 | 6.82 | 4.13 | 15.00 | 0.37 | 0.61 | ◎ | 25 | C0G | X |
| 111 | 1.11 | 5 | 4.86 | 8.18 | 4.96 | 18.00 | 0.37 | 0.61 | ◎ | 25 | C0G | X |
| 112 | 1.08 | 4 | 4.86 | 8.18 | 4.96 | 18.00 | 0.37 | 0.61 | ◎ | 26 | C0G | X |
| 113 | 1.10 | 3.5 | 4.86 | 8.18 | 4.96 | 18.00 | 0.37 | 0.61 | ◎ | 25 | C0G | X |
| 114 | 1.10 | 4 | 4.86 | 8.18 | 4.96 | 18.00 | 0.37 | 0.61 | ◎ | 25 | C0G | X |
| 115 | 1.01 | 0.5 | 1.75 | 2.75 | 1.80 | 6.30 | 0.38 | 0.65 | ◎ | 27 | C0G | ◎ |
| 116 | 1.01 | 0.6 | 1.93 | 3.12 | 1.95 | 7.00 | 0.38 | 0.63 | ◎ | 27 | C0G | ◎ |
| 117 | 1.04 | 3.0 | 3.00 | 6.64 | 3.36 | 13.00 | 0.30 | 0.51 | ◎ | 25 | C0G | ◎ |
| 118 | 1.03 | 1.5 | 1.55 | 6.03 | 1.42 | 9.00 | 0.21 | 0.24 | ◎ | 26 | C0G | ◎ |
| 119 | 1.03 | 1.5 | 3.00 | 4.78 | 1.22 | 9.00 | 0.50 | 0.26 | ◎ | 27 | C0G | ◎ |
| 120 | 1.07 | 3.0 | 3.55 | 4.43 | 5.02 | 13.00 | 0.38 | 1.13 | ◎ | 25 | C0G | ◎ |
| 121 | 1.07 | 2.7 | 3.45 | 2.55 | 6.00 | 12.00 | 0.40 | 2.35 | ◎ | 26 | C0G | ◎ |

TABLE 2

| Main Phase $CaZrO_3$ | Composition (mol % to $CaZrO_3$) | | | | Converted Value | | | Evaluation Item | | | |
|---|---|---|---|---|---|---|---|---|---|---|---|
| Sample No. | Ca/Zr ratio | Mn | Li | B | Si | Li + B + Si | Li/(B + Si) | Si/B | Densification | Permittivity | TC | HALT |
| 201 | 1.00 | 0.5 | 1.62 | 2.73 | 1.65 | 6.00 | 0.37 | 0.61 | ◎ | 27 | C0G | ◎ |
| 202 | 1.00 | 0.5 | 0.82 | 3.23 | 1.95 | 6.00 | 0.16 | 0.61 | ◎ | 27 | C0G | ◎ |
| 203 | 1.00 | 0.5 | 0.00 | 3.74 | 2.26 | 6.00 | 0.00 | 0.61 | X | — | — | — |
| 204 | 1.00 | 0.5 | 1.62 | 3.55 | 0.83 | 6.00 | 0.37 | 0.23 | ◎ | 26 | C0G | ◎ |

TABLE 2-continued

| Main Phase CaZrO$_3$ | Composition (mol % to CaZrO$_3$) | | | | Converted Value | | | Evaluation Item | | | |
|---|---|---|---|---|---|---|---|---|---|---|---|
| Sample No. | Ca/Zr ratio | Mn | Li | B | Si | Li + B + Si | Li/(B + Si) | Si/B | Densification | Permittivity | TC | HALT |
| 205 | 1.00 | 0.5 | 0.82 | 4.20 | 0.98 | 6.00 | 0.16 | 0.23 | ◎ | 27 | C0G | ◎ |
| 206 | 1.00 | 0.5 | 0.00 | 4.87 | 1.13 | 6.00 | 0.00 | 0.23 | X | — | — | — |
| 207 | 1.00 | 0.5 | 1.62 | 4.38 | 0.00 | 6.00 | 0.37 | 0.00 | ◎ | 26 | C0G | X |
| 208 | 1.00 | 0.5 | 3.22 | 1.73 | 1.05 | 6.00 | 1.16 | 0.61 | X | — | — | — |
| 209 | 1.00 | 0.5 | 2.82 | 1.98 | 1.20 | 6.00 | 0.89 | 0.61 | X | — | — | — |
| 210 | 1.00 | 0.5 | 2.42 | 2.23 | 1.35 | 6.00 | 0.68 | 0.61 | X | — | — | — |
| 211 | 1.00 | 0.5 | 2.11 | 2.42 | 1.47 | 6.00 | 0.54 | 0.61 | ◎ | 26 | C0G | ◎ |
| 212 | 1.00 | 0.5 | 1.62 | 2.73 | 1.65 | 6.00 | 0.37 | 0.61 | ◎ | 27 | C0G | ◎ |
| 213 | 1.08 | 4.0 | 4.05 | 5.72 | 5.23 | 15.00 | 0.37 | 0.91 | ◎ | 25 | C0G | ◎ |
| 214 | 1.08 | 4.0 | 4.05 | 4.63 | 6.32 | 15.00 | 0.37 | 1.37 | ◎ | 27 | C0G | ◎ |
| 215 | 1.08 | 4.0 | 4.05 | 3.53 | 7.42 | 15.00 | 0.37 | 2.10 | ◎ | 26 | C0G | ◎ |
| 216 | 1.08 | 4.0 | 4.05 | 2.55 | 8.40 | 15.00 | 0.37 | 3.29 | ◎ | 25 | C0G | ◎ |
| 217 | 1.08 | 4.0 | 4.05 | 1.50 | 9.45 | 15.00 | 0.37 | 6.30 | X | — | — | — |

As shown in Table 2, the capacitors of sample Nos. 201, 202, 204, 205, 211 to 216 of the present invention having the Li/(B+Si) ratio, that is, b/(c+d) of from 0.15 to 0.55, and the Si/B ratio, that is, d/c of from 0.20 to 3.30 could be sintered (densified) at 1000° C. or lower and improved with the life as 100 hr or more. On the contrary, the capacitors of sample Nos. 203, 206 not containing Li with the Li/(B+Si) ratio, that is, b/(c+d) of 0 and the capacitors of sample Nos. 208 to 210 with the Li/(B+Si) ratio, that is, b/(c+d) of exceeding 0.55 could not be sintered (densified) at 1000° C. or lower. Further, the capacitor of sample No. 207 not containing Si with the Si/B ratio, that is d/c of 0, had a life of less than 100 hr and the capacitor of sample No. 217 with the Si/B ratio, that is, d/c exceeding 3.30 could not be sintered (densified) at 1000° C. or lower.

Example 3

Dielectric powders were obtained in the same manner as in Example 1 except for setting Mn to 2.0 mol, the total content b+c+d for Li+B+Si to 12.0 mol, the Li/(B+Si) ratio, that is, b/(c+d) to 0.37 and the Si/B ratio, that is, d/c at 0.61 (Li: 3.24 mol, B: 5.45 mol, Si: 3.31 mol) and, further, mixing Mg(MgO) by 1.0 mol, Mg(MgO) by 2.0 mol, and Al(Al$_2$O$_3$) by 0.5 mol respectively based on 100 mol of CaZrO$_3$ with the value x for the Ca/Zr ratio at 1.05. Then, multi-layer ceramic capacitors of sample Nos. 301 to 303 were prepared in the same manner as in Example 1 and the characteristics were evaluated. Further, dielectric powders were obtained in the same manner as in Example 1 except for using (Ca$_{0.9}$Sr$_{0.1}$)ZrO$_3$ with a portion of Ca in CaZrO$_3$ being substituted by Sr, or Ca(Zr$_{0.9}$Ti$_{0.1}$)O$_3$ with a portion of Zr being substituted by Ti, while setting the Mn content, that is, the value a to 2.0 mol, the total content b+c+d for Li+B+Si to 12.0 mol, the Li/(B+Si) ratio, that is, b/(c+d) to 0.37, and the Si/B ratio, that is, d/c to 0.61 (Li: 3.24 mol, B: 5.45 mol, and Si: 3.31 mol) based on 100 mol of (Ca$_{0.9}$Sr$_{0.1}$)ZrO$_3$ or Ca(Zr$_{0.9}$Ti$_{0.1}$)O$_3$ with the (Ca+Sr)/Zr ratio or the Ca/(Zr+Ti) ratio, that is, the A/B ratio of 1.05. Then, multi-layer ceramic capacitors of sample Nos. 304 and 305 were prepared and the characteristics were evaluated in the same manner as in Example 1.

TABLE 3

| Main Phase | Composition (mol % to main phase) | | | | | | Converted Value | | | Evaluation item | |
|---|---|---|---|---|---|---|---|---|---|---|---|
| | A/B ratio | Mn | Li | B | Si | Additive | Li + B + Si | Li/(B + Si) | Si/B | Densification | HALT |
| CaZrO$_3$ | 1.05 | 2.0 | 3.24 | 5.45 | 3.31 | Mg: 1.0 | 12.00 | 0.37 | 0.61 | ◎ | ◎ |
| CaZrO$_3$ | 1.05 | 2.0 | 3.24 | 5.45 | 3.31 | Mg: 2.0 | 12.00 | 0.37 | 0.61 | ◎ | ◎ |
| CaZrO$_3$ | 1.05 | 2.0 | 3.24 | 5.45 | 3.31 | Al: 0.5 | 12.00 | 0.37 | 0.61 | ◎ | ◎ |
| (Ca$_{0.9}$Sr$_{0.1}$)ZrO$_3$ | 1.05 | 2.0 | 3.24 | 5.45 | 3.31 | | 12.00 | 0.37 | 0.61 | ◎ | ◎ |
| Ca(Zr$_{0.9}$Ti$_{0.1}$)O$_3$ | 1.05 | 2.0 | 3.24 | 5.45 | 3.31 | | 12.00 | 0.37 | 0.61 | ◎ | ◎ |

As shown in Table 3, in a case of substituting a portion of Ca with Sr or substituting a portion of Zr with Ti in CaZrO$_3$, even when other ingredients than Mn, Li, B, and Si such as Mg, Al, etc. are contained, multi-layer ceramic capacitors that could be sintered (dencified) at 1000° C. or lower and had a life of 100 hr or more could be obtained by defining the Ca/Zr ratio (A/B ratio) as 1.00 to 1.10, and the Mn content, that is, the value a as 0.5 to 4.0 mol, and the total content b+c+d for Li+B+Si as 6.0 to 15.0 mol, the Li(B+Si) ratio, that is, b/(c+d) as 0.15 to 0.55, and the Si/B ratio, that is, d/c as 0.20 to 3.30 based on 100 mol of CaZrO$_3$.

The compositions of the dielectric ceramics of the invention are not restricted to the descriptions described above but various modifications are possible within a range not departing the gist of the invention. For example, simultaneous substitution for the portion of Ca in the Ca$_x$ZrO$_3$ as the main ingredient by two elements Ti and Sr has been conducted generally, which is also within a range of the purpose of the invention and is permitted. Further, simultaneously with partial substitution for Ca, addition of Mg and Al alone or simultaneously for the two ingredients is also within the range of the purpose of the invention and is permitted.

Therefore, it should be clearly understood that the forms of the present invention are illustrative only and are not intended to limit the scope of the present invention.

The present application claims priority to Japanese Patent Application No. 2007-171337, filed Jun. 29, 2007, the disclosure of which is incorporated herein by reference in its entirety.

What is claimed is:

1. Dielectric ceramics represented as:

$Ca_xZrO_3+aMn+bLi+cB+dSi$, comprising:

based on 100 mol of $Ca_xZrO_3$ (where Ca and Zr include each a partial substitute, and $1.00 \leq x \leq 1.10$), $0.5 \leq a \leq 4.0$ mol, and $6.0 \leq b+c+d \leq 15.0$ mol, in which $0.15 \leq b/(c+d) \leq 0.55$, and $0.20 \leq d/c \leq 3.30$.

2. Dielectric ceramics according to claim 1, wherein a portion of Ca in the $Ca_xZrO_3$ is replaced by Sr.

3. Dielectric ceramics according to claim 1, wherein a portion of Zr in the $Ca_xZrO_3$ is replaced by Ti.

4. Dielectric ceramics according to claim 1, wherein Mg and/or Al is further contained.

5. Dielectric ceramics according to claim 1, wherein a portion of Ca in the $Ca_xZrO_3$ is replaced by Sr and further, Mg and/or Al is contained.

6. Dielectric ceramics according to claim 1, wherein a portion of Zr in the $Ca_xZrO_3$ is replaced by Ti and, further, Mg and/or Al is contained.

7. Dielectric ceramics according to claim 1, wherein a portion of Ca in the $Ca_xZrO_3$ is replaced by Sr and Ti, and, further, Mg and/or Al is contained.

8. A multi-layer ceramic capacitor including a plurality of dielectric ceramic layers, an internal electrode comprising Cu or a Cu alloy formed between the dielectric ceramic layers, and an external electrode connected electrically with the internal electrode, in which the dielectric ceramic layer comprises the dielectric ceramics according to claim 1.

* * * * *